United States Patent
Shingai (10) Patent No.: US 8,393,610 B2
(45) Date of Patent: Mar. 12, 2013

(54) SHEET FEEDING DEVICE AND ORIGINAL SHEET CONVEYING DEVICE WITH FEED-OUT ROLLER PROTRUDED FROM THE SHEET TRAY AND FRICTION MEMBER APPLYING FRICTION TO UPPERMOST SHEET

(75) Inventor: Hiroyuki Shingai, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 363 days.

(21) Appl. No.: 12/732,306

(22) Filed: Mar. 26, 2010

(65) Prior Publication Data
US 2010/0328737 A1   Dec. 30, 2010

(30) Foreign Application Priority Data
Jun. 24, 2009   (JP) ................. 2009-149442

(51) Int. Cl.
*B65H 3/52*   (2006.01)
(52) U.S. Cl. .......... 271/124; 271/23; 271/121; 271/123; 271/165
(58) Field of Classification Search .................. 271/124, 271/121, 123, 23, 165
See application file for complete search history.

(56) References Cited

U.S. PATENT DOCUMENTS
7,455,288 B2 * 11/2008 Ruhe et al. ............... 271/124

FOREIGN PATENT DOCUMENTS

| JP | 48-043702 U | 6/1973 |
| JP | 55-046419 U | 3/1980 |
| JP | 59-187639 U | 12/1984 |
| JP | 60-001739 U | 1/1985 |
| JP | 01-103635 U | 7/1989 |
| JP | 04-125256 U | 11/1992 |
| JP | 05201556 A * | 8/1993 |
| JP | 7-187428 A | 7/1995 |
| JP | 07187428 A * | 7/1995 |
| JP | 09-328233 | 12/1997 |
| JP | 2001-019192 | 1/2001 |

OTHER PUBLICATIONS

JP Office Action dtd Apr. 19, 2011, JP Appln. 2009-149442, English translation.

* cited by examiner

*Primary Examiner* — Gerald McClain
(74) *Attorney, Agent, or Firm* — Banner & Witcoff, Ltd.

(57) ABSTRACT

A sheet feeding device, which is configured to feed stacked sheets one by one in a sheet feed direction, is provided with a sheet tray configured to accommodate the stacked sheets, a feed-out roller protruded from the sheet tray and configured to feed the stacked sheets from the sheet tray, a feed-out nip member arranged above and opposite to the feed-out roller, the feed-out nip member being configured to contact an uppermost sheet of the stacked sheets and bias the sheets toward the feed-out roller, a separation unit located on a downstream side, in the sheet feed direction, of the feed-out roller, the separation unit separating a lowermost sheet from the stacked sheets fed by the feed-out roller, and a friction member configured to contact the uppermost sheet of the stacked sheets at a position different from a position where the feed-out nip member contacts the uppermost sheet.

13 Claims, 8 Drawing Sheets

SHEET FEEDING DEVICE AND ORIGINAL SHEET CONVEYING DEVICE WITH FEED-OUT ROLLER PROTRUDED FROM THE SHEET TRAY AND FRICTION MEMBER APPLYING FRICTION TO UPPERMOST SHEET

CROSS-REFERENCE TO RELATED APPLICATION

This application claims priority under 35 U.S.C. §119 from Japanese Patent Application No. 2009-149442 filed on Jun. 24, 2009. The entire subject matter of the application is incorporated herein by reference.

BACKGROUND

1. Technical Field

The following descriptions relate to a sheet feeding device configured to feed stacked sheets and an original sheet conveying device employing the sheet feeding device.

2. Prior Art

A sheet feeding device which is configured to feed the lowermost sheet of a stack of sheets such as printing sheets and the like has been known. Such a feeding device typically includes a pick-up roller and a feed roller, which is located on the downstream side of the pick-up roller, both arranged below the stacked sheets, and a biasing member which applies biasing force that urges the stacked sheets toward the pick-up roller, and a separation member which separates a sheet from the stacked sheets.

SUMMARY OF THE INVENTION

According to the conventional sheet feeding device described above, when the number of the sheets is relatively large, the leading end of the stacked sheets may not reach the feed roller. If the pick-up roller is rotated in such a state, due to friction among the sheets, the rotating force applied to the lowermost sheet works to move the stacked sheets as a whole. In such a case, the lowermost sheet will not be separated from the stack of the sheets and will not reach the sheet feed roller. As a result, an idle sheet feeding, which is a phenomenon where the feed roller rotates but no sheet is fed thereby, may occur.

In order to avoid the idle sheet feeding, the biasing force of the biasing member may be increased so that the pick-up roller assuredly conveys the stacked sheets toward the sheet feed roller. According to such a configuration, however, due to relatively strong biasing force applied by the biasing member to the stacked sheets, a multiple sheet feeding, which is a phenomenon where multiple sheets nipped between the pick-up roller and the biasing member are fed in an overlapped state at a time, may occur without the lowermost sheet being separated from the stacked sheets.

In consideration of the above, aspects of the present invention provide an improved sheet feeding device in which the idle sheet feeding and the multiple sheet feeding can be suppressed, and an original sheet conveying device employing such a sheet feeding device.

According to aspects of the invention, there is provided a sheet feeding device, which is configured to feed stacked sheets one by one in a sheet feed direction, is provided with a sheet tray configured to accommodate the stacked sheets, a feed-out roller protruded from the sheet tray and configured to feed the stacked sheets from the sheet tray, a feed-out nip member arranged above and opposite to the feed-out roller, the feed-out nip member being configured to contact an uppermost sheet of the stacked sheets and bias the stacked sheets toward the feed-out roller, a separation unit located on a downstream side, in the sheet feed direction, of the feed-out roller, the separation unit being configured to separate a lowermost sheet from the stacked sheets fed by the feed-out roller, and a friction member configured to contact the uppermost sheet of the stacked sheets at a position different from a position where the feed-out nip member contacts the uppermost sheet.

DETAILED DESCRIPTION OF THE EMBODIMENT

Hereinafter, referring to the accompanying drawings, an embodiment and modifications thereof according to aspects of the invention will be described.

In the following description, a configuration of an original sheet conveying device 1 provided with a sheet feeding device 100 will be described, and then, the sheet feeding device 100 will be described in detail.

In the following description, a "conveying direction" represents a direction in which a sheet is conveyed from a sheet feed tray 110 to an ejected sheet tray 20 (see heavy—solid line in FIG. 1), a "sheet feed direction" represents a direction in which the sheet is fed from the sheet feed tray 110 to a scanning position R (i.e., a direction from a right-hand side position to a left-hand side position in FIG. 1). Further, an upstream side and a downstream side in the conveying direction and the sheet feed direction will be simply referred to as an "upstream side" and a "downstream side" and a direction perpendicular to the conveying direction (or sheet feed direction) will be referred to as a "width direction" of the sheet.

Figure 1:
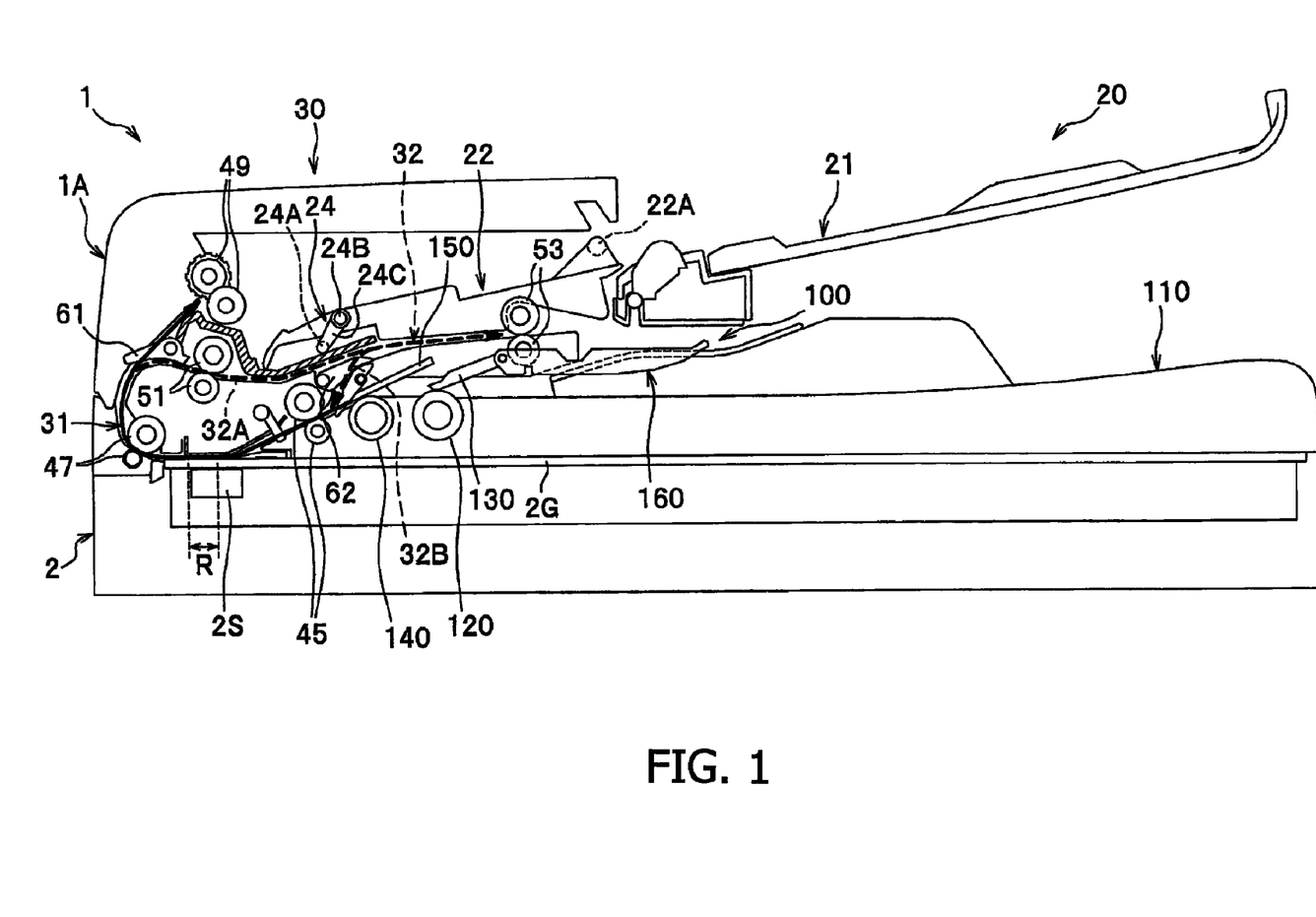
FIG. 1 is a cross-sectional side view schematically showing an entire configuration of an original sheet conveying device which employs a sheet feeding device according to an embodiment of the invention.

The original sheet conveying device 1 is provided with the sheet feed tray 110 on which original sheets are to be placed, the ejected sheet tray 20 on which the sheets ejected from the original sheet conveying device 1 are stacked, and a sheet conveying unit 30 which conveys the original sheet from the sheet feed tray 110 to the ejected sheet tray 20 (see FIG. 1).

Below the original sheet conveying device 1, a well-known flat bed scanner 2 is provided. The flat bed scanner 2 and the original sheet conveying device 1 constitute a scanning apparatus. According to the embodiment, the original sheet conveying device 1 is openable and closeable with respect to the flat bed scanner 2.

The flat bed scanner 2 has a platen glass 2G, on which the original sheet is placed when the original sheet conveying device 1 is opened, and an image sensor 2S, which extends in the width direction and is movable in the sheet feed direction to scan the original sheet two-dimensionally. The image sensor 2S moves in the sheet feed direction to scan the original sheet placed on the platen glass 2G. Further, the image sensor 2S scans the original sheet conveyed to a scanning position R by the original sheet conveying device 1. When the conveyed original sheet is scanned, the image sensor 2S stays at the scanning position R, and as the original sheet is conveyed to pass the reading position R, the entire surface of the original sheet is scanned.

The ejected sheet tray 20 is arranged above the sheet feed tray 110, and provided with a fixed tray 21 and a flap 22 provided on the upstream side of the fixed tray 21. The fixed tray 21 is secured to a frame 1A constituting an outer frame of the original sheet conveying device 1, and is configured such that the fixed tray 21 is not normally displaced with respect to the sheet conveying unit 30. The flap 22 is configured to be swingably secured to the frame 1A such that the flap 22 is swingable about an axis 22A located on the downstream side of the flap 22 and an end portion thereof on the upstream side swings vertically.

Figure 2A:
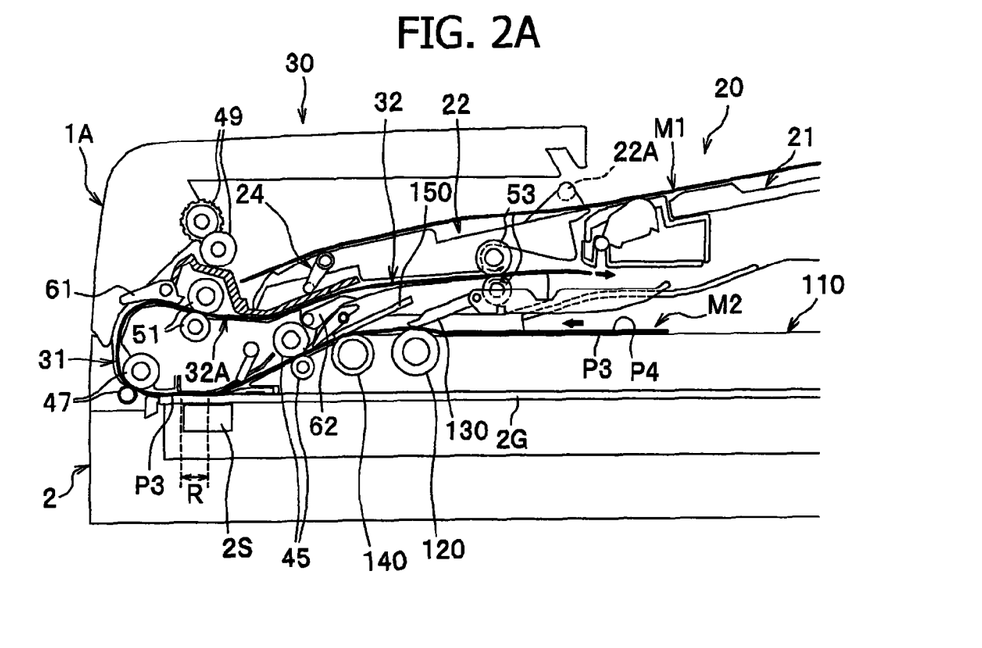
FIGS. 2A and 2B are cross-sectional side views of the sheet feeding device illustrating an operation of the sheet feeding device when a both-side scanning of a sheet is performed.
Figure 2B:
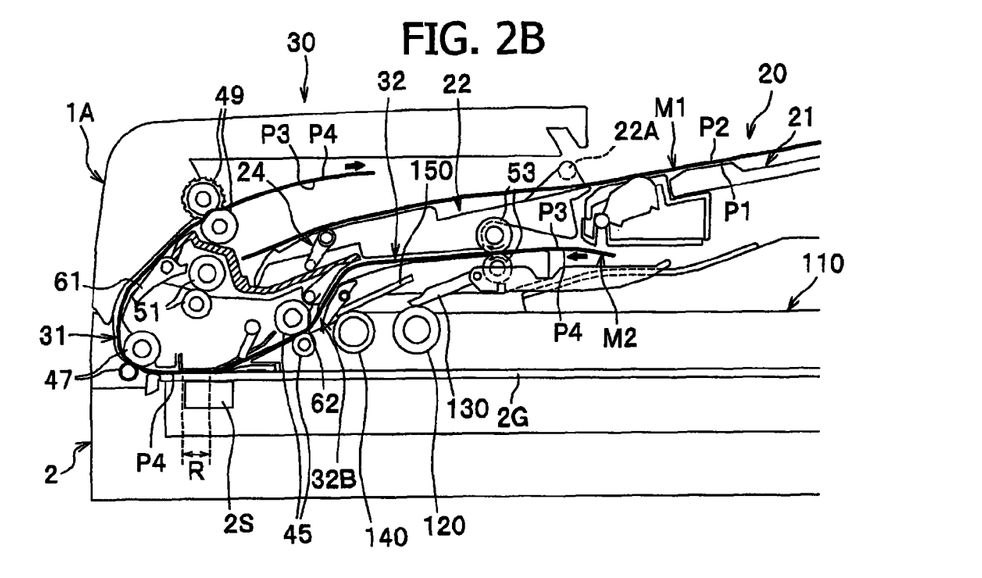
Figure 3:
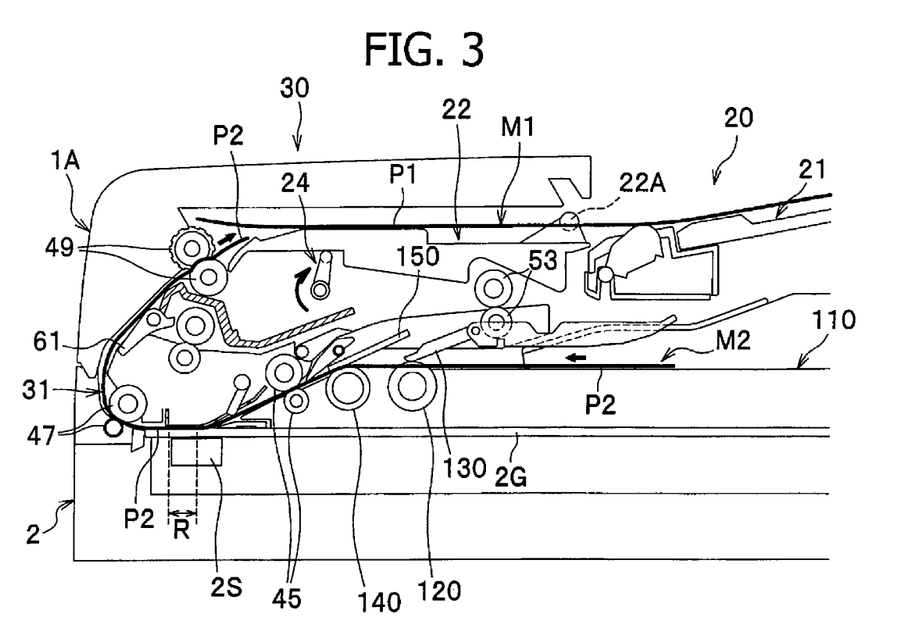
FIG. 3 is a cross-sectional side view of the sheet feeding device illustrating an operation of the sheet feeding device when a one-side scanning of a sheet is performed.

The flap 22 is driven to swing vertically in accordance with the movement of a cam mechanism 24 provided to the frame 1A. The cam mechanism 24 is provided at the upstream end side of the flap 22. The cam mechanism 24 has a pushup bar 24A which extends in the width direction below the flap 22, a pair of shafts 24B which are rotatably supported by the frame 1A, and a pair of junction members 24C which connect both ends, in the width direction, of the pushup bar 24A and the pair of shafts 24B. As the shafts 2B rotate, the flap 22 is driven to move between a lower position as shown in FIGS. 2A and 2B and an upper position as shown in FIG. 3.

In the sheet conveying unit 30, a U-shaped sheet conveying path 31 (which is indicated by a thick solid line in FIG. 1) which guides the sheet from the sheet feed tray 110 to the ejected sheet tray 20, and a substantially Y-shaped reversed path 32 (which is indicated by a thick broken line in FIG. 1) which is used for reversing the front/back surfaces of the sheet are defined.

Along the sheet conveying path 31, there are provided, from the upstream side to the downstream side, a feed-out roller 120, a feed-out nip member 130, a separation roller 140, a separation nip member 150, first conveying rollers 45, second conveying rollers 47 and ejection rollers 49 are arranged. Between the first conveying rollers 45 and the second conveying rollers 47, a scanning position R is defined, at which the sheet faces the image sensor 2S with the platen glass 2G therebetween. On the downstream side of the second conveying rollers 47, the conveying path 31 branches to the reverse path 32. At a portion where the conveying path 31 and the reverse path 32 branch, a flap-like first guide member 61 which swings in the up-and-down direction to switch a path of the sheet between the conveying path 31 and the reverse path 32 is provided.

The reverse path 32 includes a first path 32A, which diverges from the conveying path 31 and extends outward (i.e., the right-hand direction in FIG. 1), and a second path 32B, which diverges from the first path 32A and converges to the conveying path 31 (at the upstream side of the first conveying rollers 45). Along the first path 32A, third conveying rollers 51 and reverse rollers 53 having a drive roller and a driven roller are arranged. The drive roller of the reverse rollers 53 is configured to rotate in both directions.

When the drive roller of the reverse rollers 53 rotates forward, the reverse rollers 53 eject the sheet from the first path 32A to outside, and temporarily pause with holding the trailing end of the sheet. Then the drive roller rotates reversely to draw back the sheet, which is to be fed to the second path 32B. It should be noted that switching of the first path 32A and the second path 32B is done by the second guide member 62.

Next, an operation of the original sheet conveying device 1 for a double-side scanning and a one-side scanning will be described.

When the double-side scanning is executed, as shown in FIG. 2A, the flap 22 is located at its lowermost position, the first guide member 61 is moved to an upper position, while the second guide member 62 is moved to a downward position. Original sheets M1 and M2 are placed on the sheet feed tray 110 with the front surfaces P1 and P3 to be scanned facing downward, and with the back surfaces P2 facing upward, the original sheet M1 being placed below the original sheet M2.

When conveying of the sheet is started, the original sheet M1 on the sheet feed tray 110 is separated from the original sheet M2 and fed into the conveying path 31 by the separation roller 140. After the scanning of the original sheet M1 is finished, the original sheet M1 is ejected onto the ejected sheet tray 20, and the original sheet M2 is fed in the conveying path 31.

When conveying of the next sheet is started, the original sheet M2 on the sheet feed tray 110 is fed into the conveying path 31 by the separation roller 140. The original sheet M2 is then conveyed to the scanning position R by the first conveying rollers 45. The image sensor 2S scans the surface P3 of the original sheet M2 at the scanning position R. As the original sheet M2 is conveyed to pass through the scanning position R, a two-dimensional image of the original M2 is scanned. Thereafter, the original sheet M2 is fed to the reverse path 32 (i.e., first path 32A) by the second conveying rollers 47. The original sheet M2 is further fed by the third conveying rollers 51 and the reverse rollers 53 and ejected from the original sheet conveying device 1.

Almost all the portion of the original sheet M2 is ejected but before completely ejected, by the reverse rollers 53, to outside, and the reverse rollers 53 are paused. Then, the first guide member 61 is moved downward and the second guide member 62 is moved upward. At this stage, the upper surface of the original sheet M2 is the front surface P3, and the lower surface of the original sheet M2 is the back surface P4.

Then, the reverse rollers 53 are driven to rotate in the reverse direction as shown in FIG. 2B. Then, the original sheet M2 is dawn back and conveyed to the reverse path 32. Since the second guide member 62 has been moved upward, the introduced original sheet M2 is directed to the second path 32B. Then, the original sheet M2 is directed to the conveying path 31 and conveyed to the scanning position R by the first conveying rollers 45 (see FIG. 2B). At the scanning area R, the back surface P4 of the original sheet M2 is scanned. Since the first guide member 61 has been moved downward, the original sheet M2 is conveyed to the ejection rollers 49, and ejected onto the ejected sheet tray 20.

At this stage, the flap 22 is located its lower position. Therefore, the trailing end of the original sheet M1 previously ejected onto the ejected sheet tray 20 is below the nip of the ejection rollers 49, and the original sheet M2 is ejected on the ejected sheet tray 20 so that the original sheet M2 is stacked on the original sheet M1. Since each of the original sheets M1 and M2 are ejected such that the front surfaces P1 and P3 are lower surfaces and the back surfaces P2 and P4 are upper surfaces. Therefore, the ejected sheets are stacked so that surfaces P1, P2, P3 and P4 are aligned in this order from below, which is the same as the order of pages of the original sheets M1 and M2 when place on the sheet feed tray 110 before scanning.

When the one-side scanning is performed, the flap 22 is locates at its upper position as shown in FIG. 3, and the first guide member 61 is moved downward. The original sheets M1 and M2 are placed on the sheet feed tray 110 such that the surfaces P1 and P2 to be scanned face downward, and the original sheet M1 is placed below the original sheet M2.

When the one-side scanning is started, the original sheet M1 on the sheet feed tray 110 is separated from the original sheet M2 and fed in the conveying path 31 by the separation roller 140. Then, the original sheet M1 is conveyed to the scanning position R by the first conveying rollers 45. The image sensor 2S scans the surface P1. Then, the original sheet M1 is ejected, by the ejection rollers 49, onto the ejected sheet tray 20. The original sheet M2 is processed in the same manner.

When the one-side scanning is performed, the flap 22 is located at its upper position. When the original sheet M2 is ejected, the trailing end of the previously ejected original sheet M1 is located above the nip of the ejection rollers 49. Therefore, the original sheet M2 is ejected onto the ejected sheet tray 20 such that the original sheet M2 is pushed under the previously ejected original sheet M1. Since the original sheets M1 and M2 are ejected such that the surfaces P1 and P2 to be scanned face upward, the ejected original sheets M1 and M2 are aligned so that the surface P1 and P2 are aligned in this order, which is the same as the order of pages of the original sheets M1 and M2 when placed on the sheet feed tray 110.

Figure 4A:
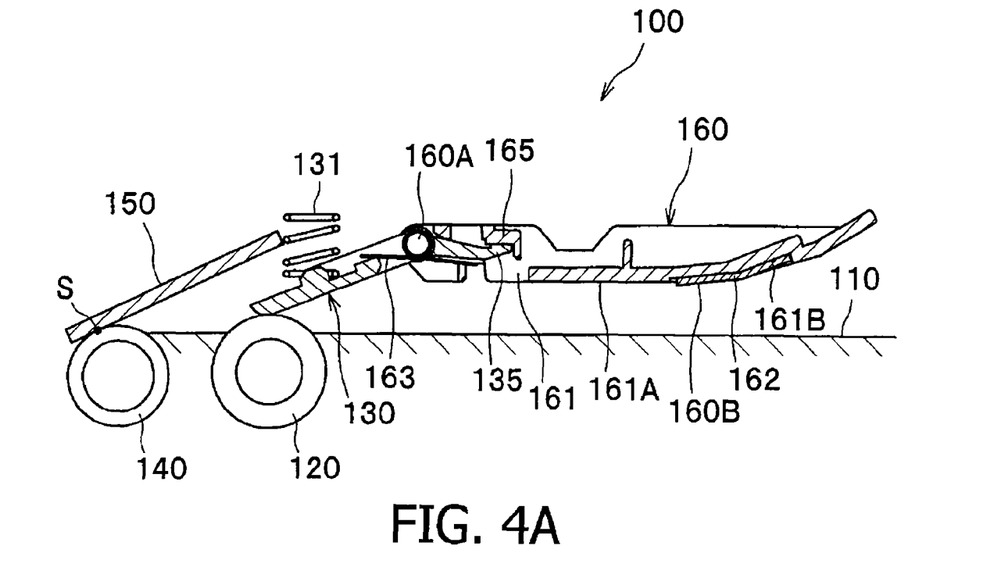
FIGS. 4A and 4B are partially cross-sectional side views showing a state where no original sheet is set (FIG. 4A), and a state where the original sheets are set (FIG. 4B).
Figure 4B:
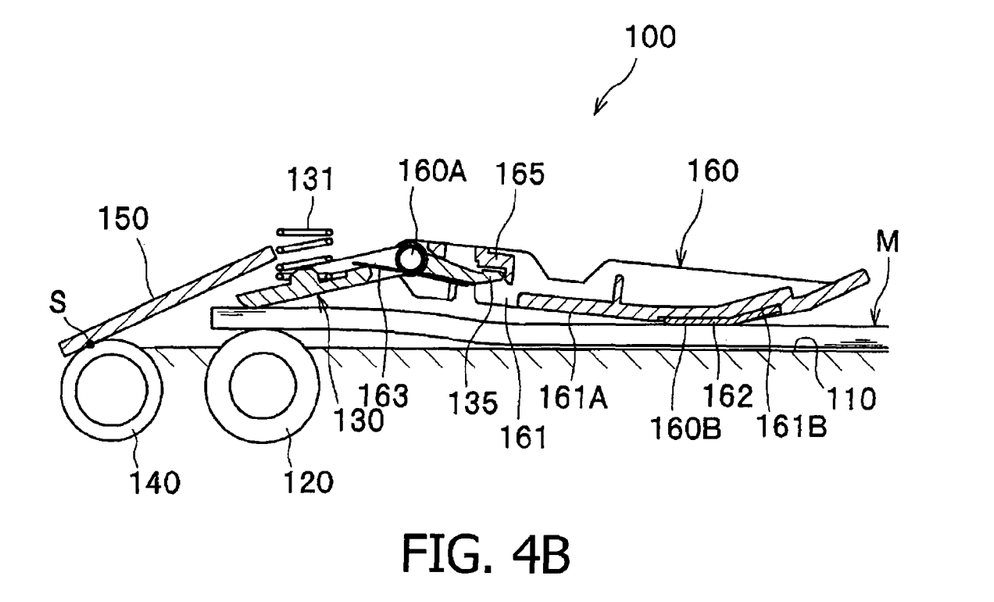

As shown in FIGS. 4A and 4B, the sheet feeding device 100 is provided with the sheet feed tray 110, the feed-out roller 120, the feed-out nip member 130, the separation roller 140, the separation nip member 150, and the friction member 160. The sheet feeding device 100 is configured to feed the lowermost sheet from the stacked original sheets M placed on the sheet feed tray 110.

The feed-out roller 120 is arranged such that an upper portion thereof is protruded from an upper surface of the sheet feed tray 110 on which the original sheets are placed. The feed-out roller 120 feeds the original sheet toward the separation roller 140.

The feed-out nip member 130 is arranged above and opposite to the feed-out roller 120. The downstream end of the feed-out nip member 130 is rockable in the up-and-down direction about a shaft 160A which is provided on the upstream side thereof. The feed-out nip member 130 is biased by a coil spring 131 toward the feed-out roller 120. As the feed-out nip member 130 biases the original sheet toward the feed-out roller 120, when the feed-out roller 120 is driven to rotate, the original sheet is fed toward the separation roller 140, i.e., toward a separation position S.

The separation roller 140 is arranged on the downstream side of the feed-out roller 120. An upper portion of the separation roller 140 is protruded from the upper surface of the sheet feed tray 110.

The separation nip member 150 is arranged above and opposite to the separation roller 140. The separation nip member 150 is swingable such that the downstream end of the separation nip member 150 is movable (swingable) vertically.

The separation nip member 150 is biased by a spring (not shown) toward the separation roller 140.

When the separation roller 140 is driven to rotate in a state where the separation nip member 150 biases the original sheets toward the separation roller 140, one original sheet is separated from the multiple sheets. As described above, a position at which the separation roller 140 and the separation nip member 150 nip the original sheet is defined as the separation position S at which one sheet is separated from the multiple original sheets fed by the feed-out roller 120 and is fed forward. The original sheet separated at the separation position S is fed along the conveying path 31, by the first conveying rollers 45, toward the scanning position R (see FIG. 1).

Figure 5:
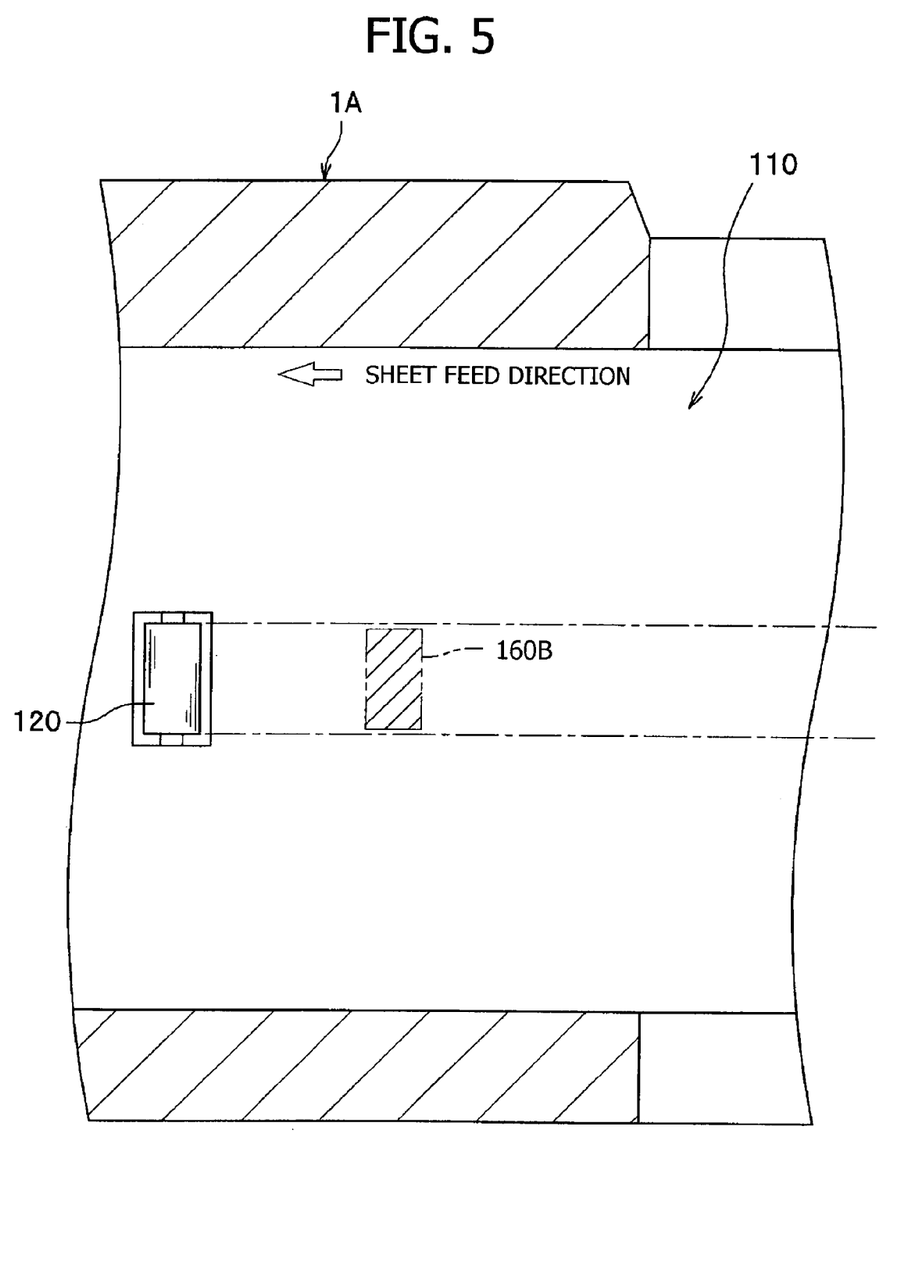
FIG. 5 is a plan view illustrating a positional relationship between a feed-out roller and a friction member.

The friction member 160 is arranged on the upstream side with respect to the feed-out roller 120, and opposite to the upper surface of the sheet feed tray 110. The upstream end of the friction member 160 is swingable vertically about the shaft 160A on the downstream side thereof. When the upstream end of the friction member 160 moves downward as shown in FIG. 4B, a contact portion 160B of a friction sheet 162 which is disposed on the upstream side of the shaft 160A, contacts the stacked original sheets M from above. It should be noted that the position where the contact portion 160B (i.e., the friction sheet 162) contacts the stacked original sheets M is different from the position where the feed-out nip member 130 contacts the stacked original sheets M. Further, the contact portion 160B (i.e., the friction sheet 162) overlaps with the feed-out roller 120 in a direction perpendicular to the sheet feed direction. Specifically, as shown in FIG. 5, in the direction perpendicular to the sheet feed direction, the contact portion 160B (i.e., the friction sheet 162) is arranged within the axial length of the feed-out roller 120.

As shown in FIGS. 4A, 4B, 6A and 6B, the friction member 160 has an arm 161 which is swingably supported so as to be swingable in the up-and-down direction, the friction sheet 162 including the contact portion 160B, and a torsion spring 163 as an example of an urging member.

Figure 6A:
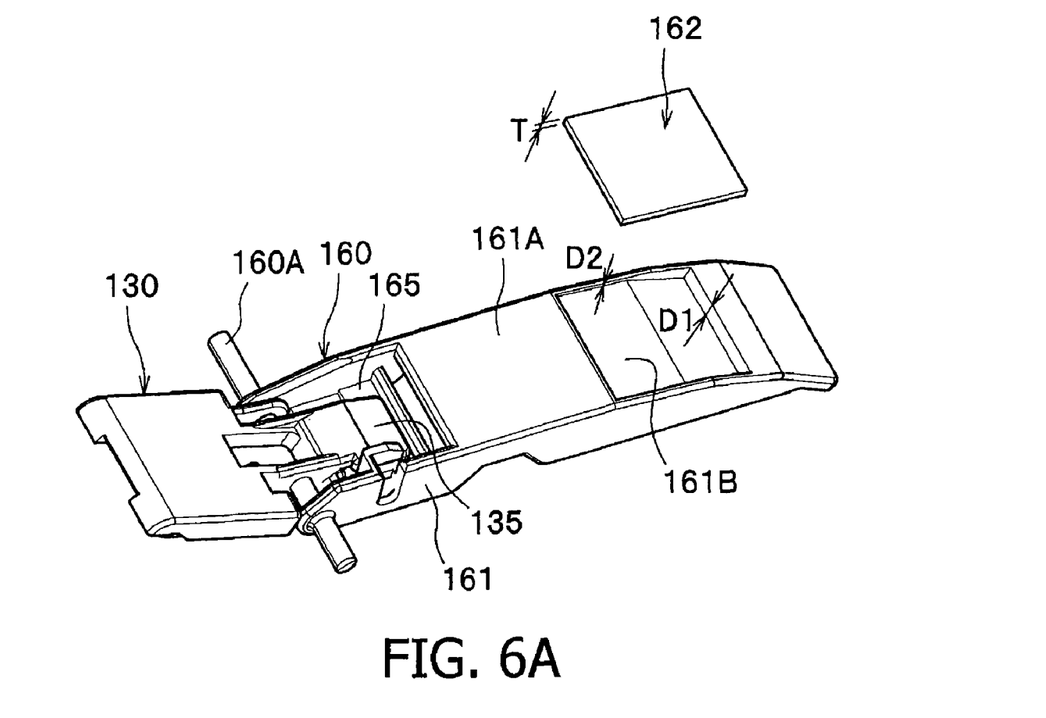
FIGS. 6A and 6B are perspective views of a feed-out nip member, viewed from the bottom, showing a state where the friction sheet has not been attached (FIG. 6A), and a state where the friction sheet has been attached (FIG. 6B).
Figure 6B:
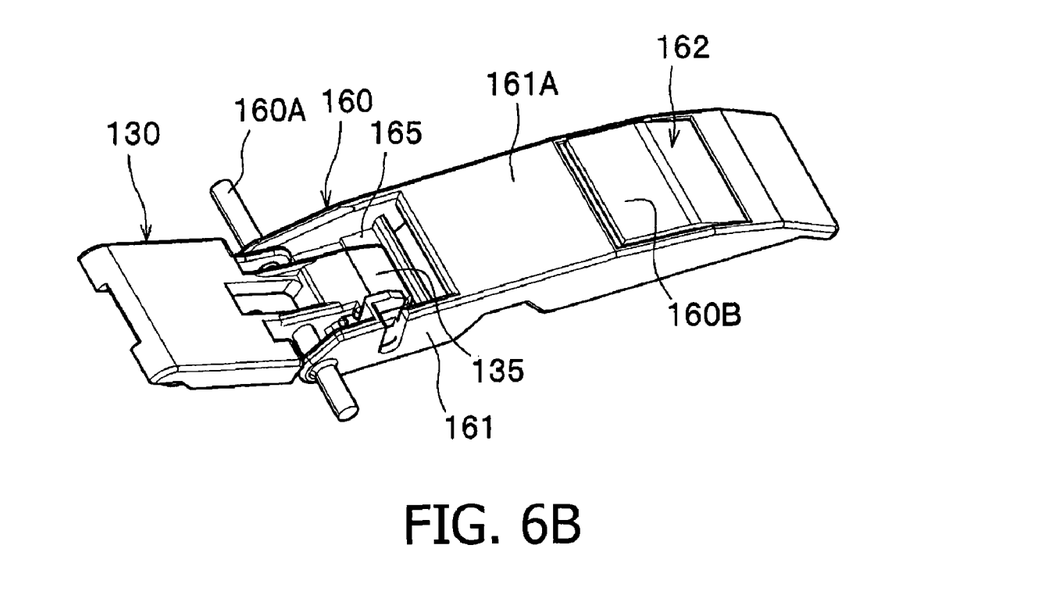

At a downstream end portion of the arm 161, the shaft 160A extending in the width direction is provided. The shaft 160A is supported by the frame 1A of the original sheet conveying device 1. With this configuration, the upstream end portion of the arm 161 is swingable in the up-and-down direction. The arm 161 is biased by the torsion spring 163 such that the upstream end portion (e.g., the contact portion 160B) of the arm 161 is urged downward. The shaft 160A also supports the feed-out nip member 130 such that the downstream end portion of the feed-out nip member 130 is swingable in the up-and-down direction about the shaft 160A.

On a lower surface 161A of the arm 161, a recess 161B to which the friction sheet 162 is attached is formed at an upstream end portion of the lower surface 161A. The recess 161B is configured such that a depth D1 of the upstream end is greater than a thickness T of the friction sheet 162. The depth gradually decreases on the downstream side, and a depth D2 on the downstream side with respect to the central position, in the sheet feed direction, is smaller than the thickness T of the friction sheet 162.

The friction sheet 162 is made of material of which frictional factor is large, e.g., cork and felt, and formed as a rectangular sheet having substantially an even thickness. The friction sheet 162 is secured to the recess 161B, for example, with use of adhesive agent or the like.

As described above, since the recess 161B is formed such that the depth D1 thereof at the upstream end is greater than the thickness T of the friction sheets, and the depth gradually decreases on the downstream side. Therefore, the upstream end portion of the friction sheet 162 attached to the recess 161B is completely accommodated inside the recess 161B so that the surface of the upstream end portion of the friction sheet 162 is below the lower surface of the arm 161. In other words, the upstream end portion of the friction sheet 162 is not protruded from the lower surface of the arm 161. Therefore, when the stack M of the original sheets is placed on the sheet feed tray 110 and the leading end thereof is inserted toward the feed-out roller 120 and feed-out nip member 130, the leading end of the stack M is hardly caught by the friction sheet 162. Thus, the original sheets can be set easily.

On the other hand, the recess 161B is formed such that the depth D2 of the portion on the downstream side with respect to the center thereof in the sheet feed direction is smaller than the thickness T of the friction sheet 162, and the downstream side portion of the friction sheet 162 is protruded from the lower surface 161A of the arm 161. Therefore, when the upstream end portion of the friction member 160 swings downward, it is ensured that the friction sheet 162 contacts the stack M of the original sheets.

The sheet feeding device 100 is further provided with an association mechanism, with which, a downward swing movement of the feed-out nip member 130 causes the friction member 160 to swing upward, and an upward swing movement of the feed-out nip member 130 causes the friction member 160 to swing downward (see FIGS. 4A and 4B). Specifically, the association mechanism includes a touching portion 135 provided to the feed-out nip member 130, a touching portion 165 provided to the friction member 160 (arm 161), and a torsion spring 163. With the association mechanism, the feed-out nip member 130 and the friction member 160 move in association with each other.

The touching portion 135 is a part of the feed-out nip member 130 and extends toward the upstream side with respect to the shaft 160A. The touching portion 165 is located so as to contact the touching portion 135 from above, on the upstream side with respect to the shaft 160A.

The association mechanism configured as above operates as follows. When the original sheets are not placed on the sheet feed tray 110, the downstream end portion of the feed-out nip member 130 swings down due to urging force of the coil spring 131 (see FIG. 4A). In this state, the touching portion 135 on the upstream side of the shaft 160A swings upward and lifts up the touching portion 165 of the friction member 160.

When the original sheets are not set (i.e., not placed on the sheet feed tray 110), as the touching portion 135 supports the touching portion 165 from beneath, the swing movement of the friction member 160 due to the urging force of the torsion spring 163 and gravity is restricted. Thus, in other words, the touching portion 135 functions to restrict the movement of the friction member 160 when the original sheets are not set. Since the downward swing movement of the friction member 160 is restricted, a prescribed space is formed between the contact portion 160B and the upper surface of the sheet feed tray 110, and the original sheets hardly contacts the contact portion 160B, which allows setting of the original sheets with ease.

It should be noted that the space between the contact portion 160B and upper surface of the sheet feed tray 110 may be designed arbitrarily. Preferably, the space (i.e., the distance) between the contact portion 160B and the upper surface of the sheet feed tray 110 when the original sheets are not set is designed such that when a first prescribed number of original sheets are set and the friction member 160 swings downward in association with the upward swing movement of the feed-out nip member 130, the contact portion 160B does not contact the original sheets. The first prescribed number of the original sheets may be the number which does not result in the idle sheet feeding, and, the first prescribed number may be, for example, twenty.

As shown in FIG. 4B, when a second prescribed number (which is larger than the first prescribed number) of original sheets, or a stack M of original sheets, are set, the downstream end portion of the feed-out nip member 130 is lifted by the stack M of the original sheets, against the urging force of the coil spring 131 (i.e., the feed-out nip member 130 swings upward). In association of the upward swing movement of the feed-out nip member 130, the upstream end portion of the friction member 160 swings downward, against the urging force of the torsion spring 163, and the contact portion 160B contacts the stack M of the original sheets from above (see FIG. 4B). In this case, since the contact portion 160B of the friction sheet 162 contacts the stack M of the original sheets, occurrence of the idle sheet feeding is suppressed.

Next, the operation of the sheet feeding device 100 will be described.

Figure 7A:
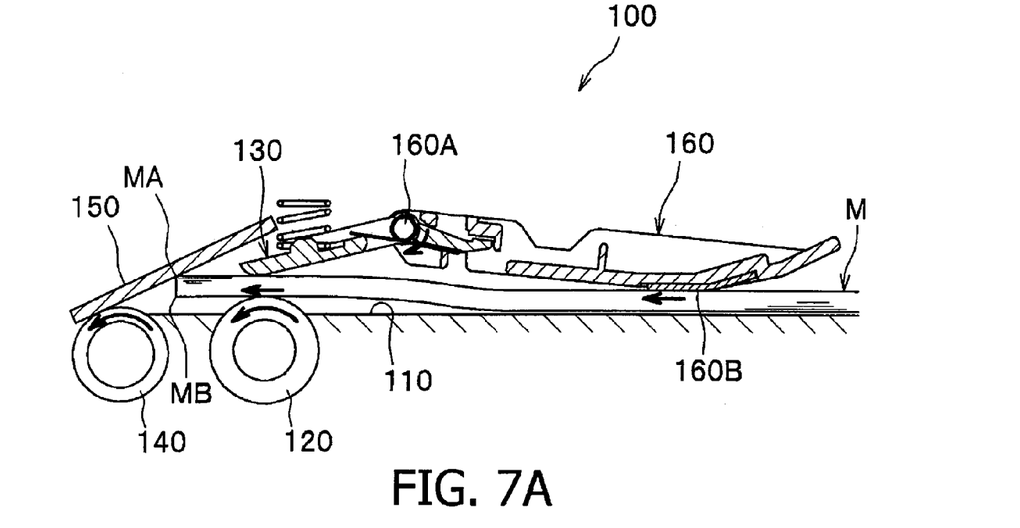
FIGS. 7A and 7B are cross-sectional side views illustrating operations of the sheet feeding device according to the embodiment of the invention.

In a state where the second prescribed number of original sheets (i.e., the stack M) is place on the sheet feed tray 110, an upper portion MA of the leading end of the stack M of the original sheets contacts the separation nip member 150, and a lower portion MB of the leading end of the stack M has not yet reached the separation roller 140, as shown in FIG. 7A, when the sheet feed operation is started, the feed-out roller 120 and the separation roller 140 are driven to start rotating. In this state, the friction member 160 has been swung downward as described above and the contact portion 160B contacts the stack M from above.

Figure 7B:
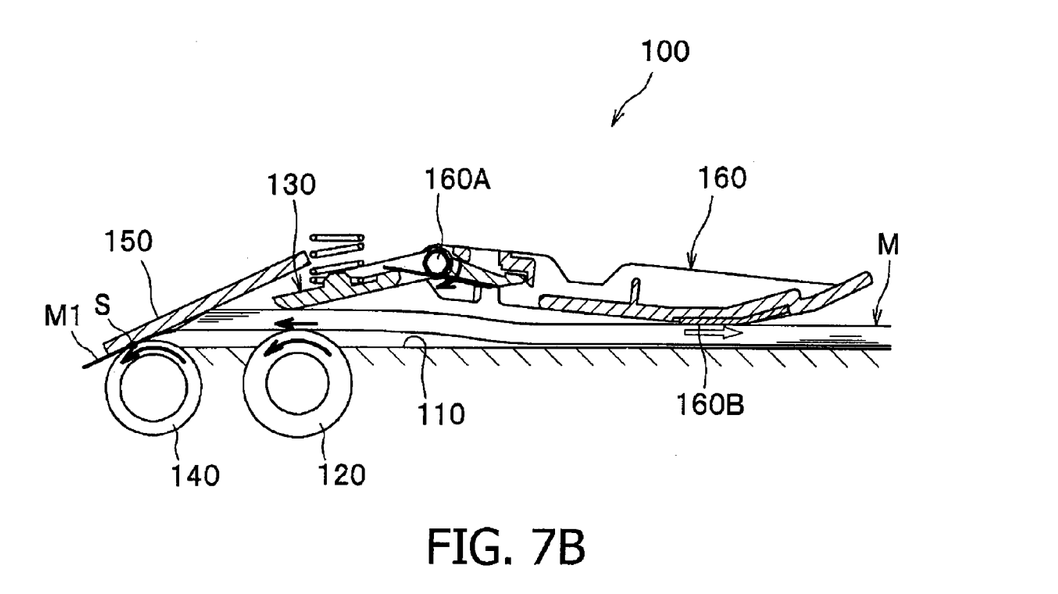

As the feed-out roller 120 and the separation roller 140 rotate, a force moving the stack M toward the downstream side is applied. However, due to the frictional force applied from the friction member 160 (see FIG. 7B), the original sheets at the upper portion of the stack M are restricted from moving, and only the original sheets at the lower portion of the stack M are moved to the downstream side by the force applied by the feed-out roller 120. Thus, the original sheets at the lower portion of the stack M move to the downstream side and reach the separation roller 140. Then, the lowermost original M1 is separated from the other original sheets at the separation position S, fed to the sheet conveying path 31, and directed to the scanning position R (see FIG. 1).

According to the sheet feeding device 100 (original sheet conveying device 1), since the friction member 160 contacts the stack M of the sheets from above, the upper portion of the stack M is prevented from being fed, while the lower portion of the stack M is allowed to be fed by the feed-out roller 120. Therefore, occurrence of the idle sheet feeding can be suppressed. Further, with this configuration, the original sheets can be fed to the separation position S without strengthening the urging force of the feed-out nit member 130 (i.e., the coil spring 131), and occurrence of the multiple-sheet feeding can also be suppressed.

According to the embodiment, the friction member 160 is arranged on the upstream side of the feed-out roller 120, and the feed-out roller 120 pulls the portion of the stack M where the contact portion 160B contacts. Therefore, in comparison with a case where the friction member is located on the downstream side of the feed-out roller, wrinkles or folding of the original sheets can be reduced.

According to the embodiment, the location of the friction member 160 and the location of the feed-out roller 120 overlap with each other in a direction perpendicular to the sheet feed direction. If the location of the friction member 160 and the location of the feed-out roller 120 are shifted in the direction perpendicular to the sheet feed direction, the original sheets tend to rotate about the contact portion 160B and skew when the feed-out roller 120 is driven to feed the stack of the original sheets. Such a problem may be resolved by providing a guide member which prevents the skew of the sheets. According to the configuration of the embodiment, however, without such a guide member for preventing the skew, it is ensured that the sheets can be fed in the sheet feed direction. Since such a guide member can be omitted, the number of parts is reduced, the structure can be simplified, and manufacturing cost can be reduced.

According to the embodiment, the friction member 160 is configured that the upstream end is swingable vertically about the shaft 160A located on the downstream side. Since the contact portion 160B is located on the upstream side with respect to the shaft 160A, it is ensured that the effect of the friction member 160 can be obtained. Specifically, as shown in FIG. 7A, by the force with which the stack M of the sheets moves to the downstream side, the contact portion 160B is pulled toward the downstream side. Then, the friction member 160 tends to swing downward and hold the stack M of the sheets. Such a movement increases the frictional force the contact portion 160B applies to the stack M of the sheets. Therefore, it is ensured that sufficient frictional force is applied to the stack M of sheets, and occurrence of the idle sheet feed can well be suppressed.

According to the embodiment, with use of the torsion spring 163 which downwardly urges the upstream end of the friction member 160, it is ensured that the frictional force is applied to the stack M of the sheets, and occurrence of the idle sheet feed can be suppressed. As shown in FIGS. 4A and 4B, the torsion spring 163 is arranged such that one end thereof urges the friction member 160 downward and the other end urges the feed-out nip member 130 downward. Therefore, the more the number of the original sheets increases to raise the feed-out nip member 130, the stronger the torsion spring 163 urges the friction member 160 downward. Therefore, it is ensured that sufficient frictional force is applied to the stack M of the sheets, and occurrence of the idle sheet feeding can be suppressed.

It should be noted that the present invention should not be limited to the above-described exemplary embodiment, and various modifications can be made without departing from the scope of the invention.

Figure 8:
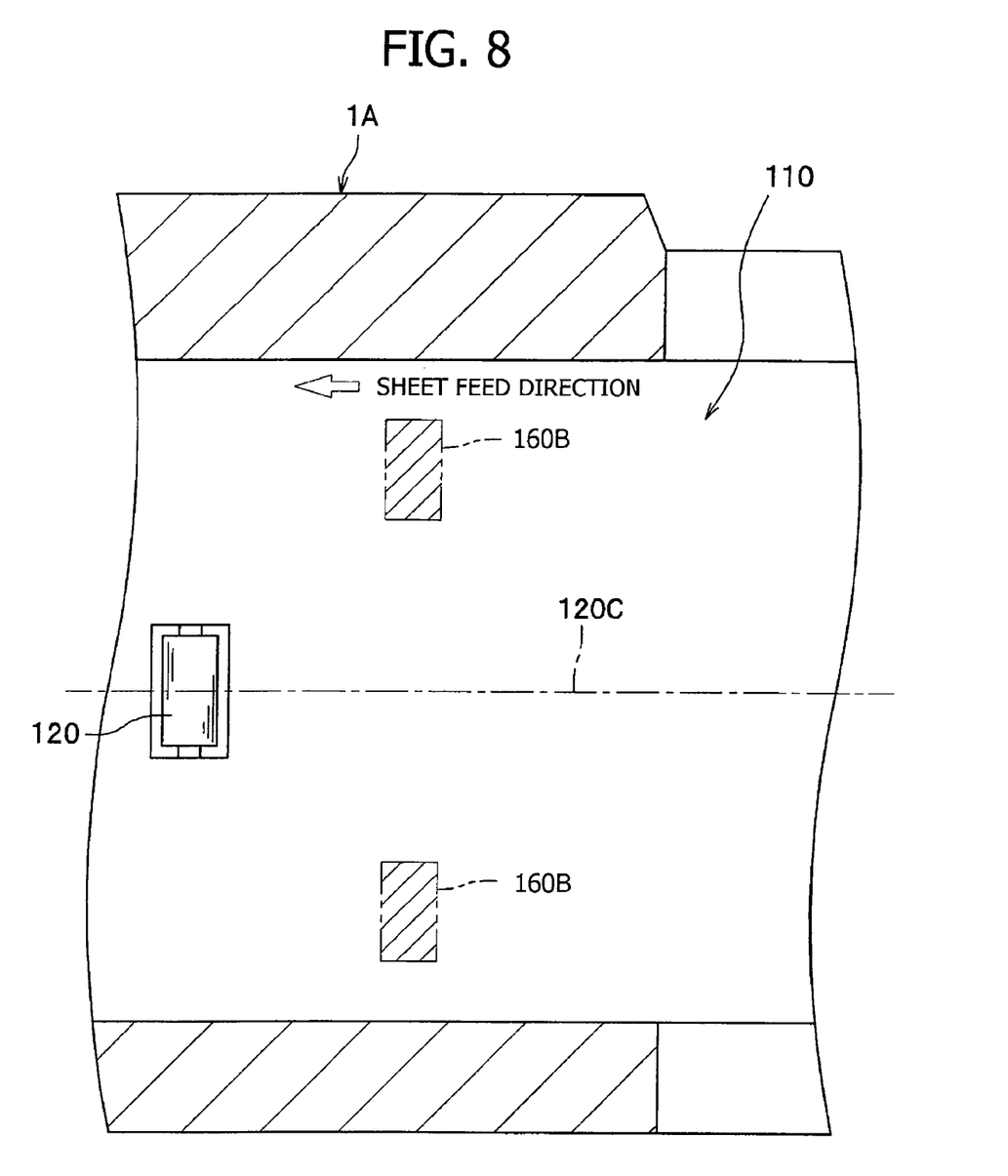
FIG. 8 is a plan view showing a positional relationship between the feed-out roller and the friction members according to modified embodiment of the present invention.

In the exemplary embodiment, only one friction member 160 is employed as shown in FIGS. 4A, 4B, and 5. It is possible to employ a plurality of friction members. If, for example, two friction members are employed, it is preferable that two contact portions 160B are arranged symmetrically in a direction perpendicular to the sheet feed direction with respect to a center line 120C which extends in the sheet feed direction and intersects with the feed-out roller 120 at the center thereof (see FIG. 8). If three friction members are employed, it is preferable that one of the friction members is arranged on the center line 120C and the other two are arranged symmetrically with respect to the center line 120C. In this case, the friction member located on the center line 120C and the other two friction members may be shifted in the sheet feed direction. When more than three friction members are employed, the arrangement thereof can be determined in analogy with the above.

In the exemplary embodiment, only one feed-out roller 120 is employed. Such a configuration can be modified and a plurality of feed-out rollers may be employed. In such a case, arrangement of the feed-out rollers may be determined in analogy with the arrangement of the friction members described above.

In the exemplary embodiment, the torsion spring 163 is employed to apply urging force to the friction member 160. The configuration should not be limited to the exemplary one, and the torsion spring can be replaced with any appropriate members such as a plate spring, coil spring or the like. Similarly, various members can be employed to apply urging force to the feed-out nip member 130 and the separation nip member 150.

In the exemplary embodiment, the touching portion 135 is provided to the feed-out nip member 130. This configuration can be modified. For example, a rod-like member arranged below the friction member 160 and extending in the width direction may be secured to the frame 1A and the friction member 160 is configured to contact the rod-like member from above, downward swing movement of the friction member 160 can be restricted.

In the exemplary embodiment, the association mechanism which realizes a mechanical association movement between the feed-out nip member 130 and the friction member 160 is employed. This configuration may be modified and the movement of the feed-out nip member 130 and the movement of the friction member 160 may be associated by software. For example, a modified configuration may include a sensor configured to detect the position of the feed-out nip member, a moving mechanism configured to slide the friction member vertically, and a controller. The controller controls the moving mechanism to slide the friction member upward if the feed-out nip member is located at a lower position, while the controller controls the moving mechanism to slide the friction member downward if the feed-out nip member is located at an upper position.

Alternatively, the shaft of the feed-out nip member and the shaft of the friction member may be provided separately, and a transmission mechanism such as a gear train may be provided. In such a case, the transmission mechanism may function such that the downward swing movement of the feed-out nip member causes the upward swing movement of the friction member, and the upward swing movement of the feed-out nip member causes the downward swing movement of the friction member.

By employing the configuration in which the association mechanism includes touching portions 135 and 165, which contact each other to move the friction member as in the exemplary embodiment, or the association mechanism is realized by the gear train as mentioned above, the structure of the association mechanism can be simplified in comparison with a case where movement of the feed-out nip member and friction member is controlled with software. In addition, according to the embodiment, the touching portions 135 and 165 are provided close to the shaft 160A. Therefore, the association mechanism has a relatively compact structure, which enables simplification/downsizing of the sheet feeding device.

According to the embodiment, when the feed-out nip member 130 swings downward, the touching portions 135 and 165 contact each other, while when the feed-out nip member 130 swings upward, the touching portions 135 and 165 do not contact. This is an exemplary configuration and can be modified such that the touching portions 135 and 165 always contact each other.

According to the exemplary embodiment, the friction member 160 is configured such that the friction sheet 162 is attached to the recess 161B of the arm 161. This can be modified and the friction member itself may be made of material having a high friction factor.

According to the exemplary embodiment, the nip of the separation roller 140 and the separation nip member 150 serves as the separation position S. This configuration can be modified in various ways. For example, instead of employing the separation roller, a feed-out roller having a relatively large diameter is employed, and arranged so as to face the feed-out nip member and the separation nip member. In such a configuration, the nip between the separation nip member and the large-diameter feed-out roller may serve as the separation position.

In the exemplary embodiment, the friction member 160 is arranged on the upstream side of the feed-out roller 120. This configuration can be modified such that the friction member is arranged on the downstream side of the feed-out roller.

In the exemplary embodiment, the sheet feeding device 100 is applied to the original sheet conveying device 1. The invention need not be limited to such a configuration, but can be modified in various ways. For example, the sheet feeding device may be applied to an image forming device such as a printer, a copier and the like.

In the exemplary embodiment, an original sheet bearing images/characters on a single side or both sides is used. The invention need not be limited to such a configuration, and the sheet employed in the sheet feeding device (or original sheet conveying device) can be an unused sheet (a blank sheet), a transparency, and the like.

What is claimed is:

1. A sheet feeding device configured to feed stacked sheets one by one in a sheet feed direction, comprising:
    a sheet tray configured to accommodate the stacked sheets;
    a feed-out roller protruded from the sheet tray and configured to feed the stacked sheets from the sheet tray;
    a feed-out nip member arranged above and opposite to the feed-out roller, the feed-out nip member being configured to contact an uppermost sheet of the stacked sheets and bias the stacked sheets toward the feed-out roller;
    a separation unit located on a downstream side, in the sheet feed direction, of the feed-out roller, the separation unit being configured to separate a lowermost sheet from the stacked sheets fed by the feed-out roller;
    a friction member configured to apply friction to the uppermost sheet of the stacked sheets at a position different from a position where the feed-out nip member contacts the uppermost sheet; and
    an interlocking mechanism configured to interlock the friction member and the feed-out nip member such that movement of the feed-out nip member toward the feed-out roller causes movement of the friction member away from the sheet tray and movement of the feed-out nip member away from the feed-out roller causes movement of the friction member toward the sheet tray.

2. The sheet feeding device according to claim 1, wherein the friction member is arranged on an upstream side, in the sheet feed direction, of the feed-out roller.

3. The sheet feeding device according to claim 2, wherein the friction member is arranged such that the friction member and the feed-out roller overlap with each other as viewed from the sheet feed direction.

4. The sheet feeding device according to claim 2, further comprising a second friction member,
    wherein the friction member and the second friction member are spaced away from each other in a direction perpendicular to the sheet feed direction and arranged symmetrically with respect to a line that extends in the sheet feed direction and intersects an axial center of the feed-out roller.

5. The sheet feeding device according to claim 4, wherein the feed-out roller is disposed in a position corresponding to substantially a center of an original sheet with respect to a width direction of the original sheet perpendicular to the sheet feed direction.

6. The sheet feeding device according to claim 1,
    wherein the feed-out nip member is configured to swing vertically about an axis on an upstream end thereof in the sheet feed direction,
    wherein the association mechanism is configured to move the friction member upward when the feed-out nip member swings downward and to move the friction member downward when the feed-out nip member swings upward.

7. The sheet feeding device according to claim 6,
    wherein the association mechanism includes touching portions provided to the feed-out nip member and the friction member respectively, and
    wherein the touching portions are configured to contact each other at least when the feed-out nip member swings downward such that the friction member moves upward.

8. The sheet feeding device according to claim 1,
    wherein the friction member is configured to swing vertically about an axis on a downstream end thereof, and
    wherein the friction member includes a contact portion which is disposed on an upstream side with respect to the axis, and the contact portion is configured to contact the uppermost sheet of the stacked sheets.

9. The sheet feeding device according to claim 8, further comprising a restriction member configured to restrict a downward swing movement of the friction member such that a predetermined space is formed between the contact portion and the sheet tray.

10. The sheet feeding device according to claim 9, further comprising an urging member configured to urge the contact portion downward.

11. The sheet feeding device according to claim 8,
    wherein the friction member includes:
        an arm configured to swing vertically; and
        a friction sheet including the contact portion,
    wherein the arm is formed with a recess to which the friction sheet is attached, and
    wherein the recess is formed such that a depth thereof on the upstream side, in the sheet feed direction, is greater than a thickness of the friction sheet attached thereto, the depth decreasing toward the downstream side, in the sheet feed direction.

12. An original sheet conveying device, comprising:
    a sheet feeding device configured to feed stacked original sheets one by one in a sheet feed direction; and
    a sheet processor configured to apply a predetermined process to each original sheet fed by the sheet feeding device,
    wherein the sheet feeding device comprises:
        a sheet tray configured to accommodate the stacked original sheets;
        a feed-out roller protruded from the sheet tray and configured to feed the stacked original sheets from the sheet tray;
        a feed-out nip member arranged above and opposite to the feed-out roller, the feed-out nip member being configured to contact an uppermost original sheet of the stacked original sheets and bias the stacked original sheets toward the feed-out roller;
        a separation unit located on a downstream side, in the sheet feed direction, of the feed-out roller, the separation unit being configured to separate a lowermost original sheet from the stacked original sheets fed by the feed-out roller;

a friction member configured to apply friction to the uppermost original sheet of the stacked original sheets at a position different from a position where the feed-out nip member contacts the uppermost original sheet; and an interlocking mechanism configured to interlock the friction member and the feed-out nip member such that movement of the feed-out nip member toward the feed-out roller causes movement of the friction member away from the sheet tray and movement of the feed-out nip member away from the feed-out roller causes movement of the friction member toward the sheet tray.

13. The original sheet conveying device according to claim 12, wherein the sheet processor includes an image sensor that is configured to scan the original sheet fed by the sheet feeding device.

* * * * *